(12) United States Patent
Kim

(10) Patent No.: US 7,581,234 B2
(45) Date of Patent: Aug. 25, 2009

(54) TURNTABLE ASSEMBLY FOR SPINDLE MOTOR AND HAVING A BACK YOKE

(75) Inventor: Yong Tae Kim, Gwangjoo-shi (KR)

(73) Assignee: LG Innotek Co., Ltd., Seoul (KR)

( * ) Notice: Subject to any disclaimer, the term of this patent is extended or adjusted under 35 U.S.C. 154(b) by 455 days.

(21) Appl. No.: 11/416,316

(22) Filed: May 3, 2006

(65) Prior Publication Data

US 2006/0253862 A1 Nov. 9, 2006

(30) Foreign Application Priority Data

May 3, 2005 (KR) .................... 10-2005-0037252

(51) Int. Cl.
*G11B 17/028* (2006.01)

(52) U.S. Cl. ..................................... 720/695

(58) Field of Classification Search ............. 360/98.07, 360/98.08, 99.08, 99.12; 720/695, 710; 369/270.1, 369/264
See application file for complete search history.

(56) References Cited

U.S. PATENT DOCUMENTS

2005/0162776 A1* 7/2005 Kim ........................ 360/99.12
2006/0064712 A1* 3/2006 Kim ........................... 720/710

FOREIGN PATENT DOCUMENTS

JP 2003-217201 A 7/2003

* cited by examiner

*Primary Examiner*—Julie Anne Watko
(74) *Attorney, Agent, or Firm*—Birch, Stewart, Kolasch & Birch, LLP (57) ABSTRACT

Provided is turntable assembly of a spindle motor. The turntable assembly includes a turntable and a back yoke. The back yoke is installed on the turntable. The turntable includes at least one of a turntable coupling protrusion and a protrusion coupler formed thereon. The back yoke includes at least one of a protrusion coupler and a coupling protrusion formed thereon to face the corresponding components formed on the turntable. The coupling protrusion is inserted in the protrusion coupler to fix the back yoke to the turntable.

9 Claims, 13 Drawing Sheets

TURNTABLE ASSEMBLY FOR SPINDLE MOTOR AND HAVING A BACK YOKE

BACKGROUND OF THE INVENTION

1. Field of the Invention

The present invention relates to a turntable assembly of a spindle motor.

2. Description of the Related Art

Prevalent examples of recording media that write and read images, sounds, and other types of data at high density include optical discs, hard discs, cards, and tapes; and of these, optical discs are at the forefront of the mainstream.

The field of optical discs includes read only memory (ROM) products ranging from laser discs (LD) and compact discs (CD) to digital versatile discs (DVD).

Optical discs can be generally categorized into CDs and DVDs; CDs can be divided into CD-read only memory (CD-ROM) and CD-Rewritable (CD-RW); and DVDs can be split into DVD-ROMs and DVD-random access memory (RAM).

Such optical discs have tracks formed to spiral outward from the middle, whereon digital data of a predetermined format is written.

An optical disc apparatus for reading optical discs has a built-in spindle motor that spins an optical disc at high speed. The optical disc apparatus also includes a built-in actuator, which has a laser diode, lens, beam splitter, photodetector, and other installed optical devices.

The spindle motor has a turntable, and the turntable has bosses formed thereon. A back yoke passes through the bosses. After the back yoke passes through the bosses, the back yoke and the bosses are stuck together so that the back yoke is fixed on the turntable.

However, the method (according to the related art) of fixing the back yoke by sticking it to the bosses formed on the turntable employs excessive adhering force, which can damage the bosses.

Such damage to the bosses reduces the adhering force of the back yoke. If the adhering force of the back yoke is reduced, the back yoke disengages from the table, and is likely to cause a malfunction or failure of the spindle motor.

Furthermore, the method of adhering the bosses to the turntable results in unevenness of the adhered bosses. Under these conditions, maintenance is not easy.

SUMMARY OF THE INVENTION

Accordingly, the present invention is directed to a turntable assembly of a spindle motor that substantially obviates one or more problems due to limitations and disadvantages of the related art.

An object of the present invention is to provide a turntable assembly of a spindle motor that has an improved coupling structure for the turntable and back yoke, to furnish a reliable coupling of the turntable and back yoke.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a turntable assembly of a spindle motor including: a turntable; and a back yoke installed on the turntable, wherein the turntable includes at least one of a turntable coupling protrusion and a protrusion coupler formed thereon, and the back yoke includes at least one of a protrusion coupler and a coupling protrusion formed thereon to face the at least one turntable coupling protrusion and protrusion coupler formed on the turntable, and the coupling protrusion is inserted in the protrusion coupler, for fixing the back yoke to the turntable.

In another aspect of the present invention, there is provided a turntable assembly of a spindle motor including: a turntable; a back yoke installed on the turntable; a back yoke coupler formed on the turntable; and a turntable coupler formed on the back yoke and rotatively inserted in the back yoke coupler, for fixing the back yoke to the turntable.

In yet another aspect of the present invention, there is provided a turntable assembly of a spindle motor including: a turntable; a back yoke installed on the turntable; a back yoke catch protrusion formed on the turntable; and a turntable catch protrusion formed on the back yoke and press-fitted in the back yoke catch protrusion, for fixing the back yoke to the turntable.

The turntable assembly according to the present invention allows the back yoke to be easily fixed to the turntable using a one-touch operation, without having to perform an adhering process of the two parts. Thus, the turntable assembly is easy to assemble, and the back yoke detaching or disengaging from the turntable while an optical disc is being spun can be prevented.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
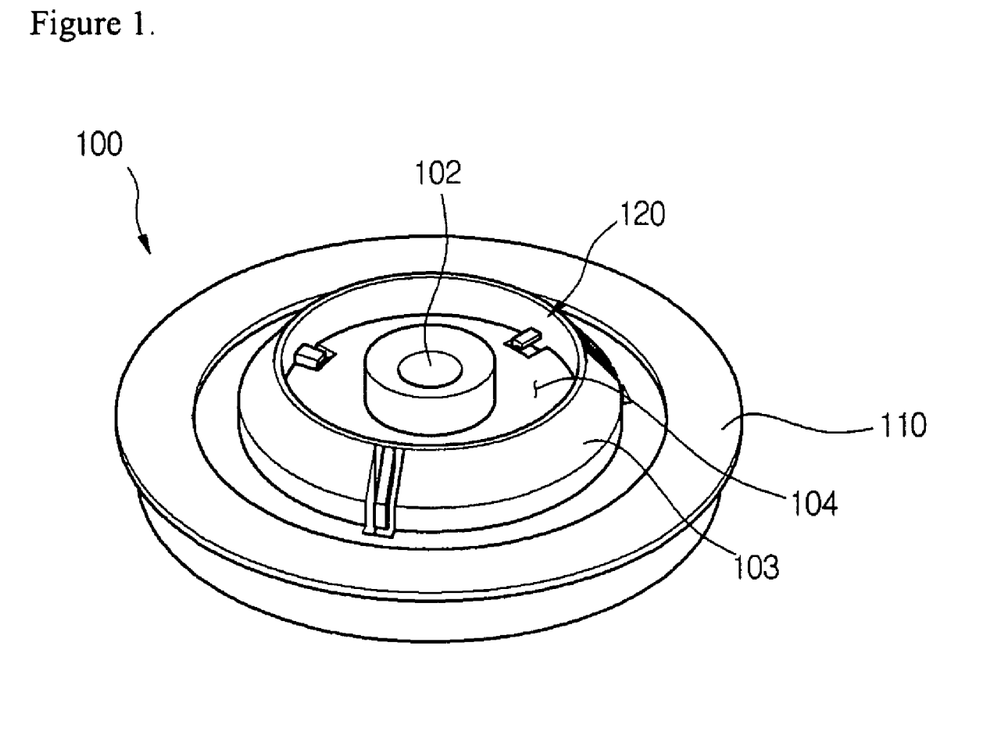
FIG. 1 is a perspective view of a turntable according to the first embodiment of present invention.
Figure 2:
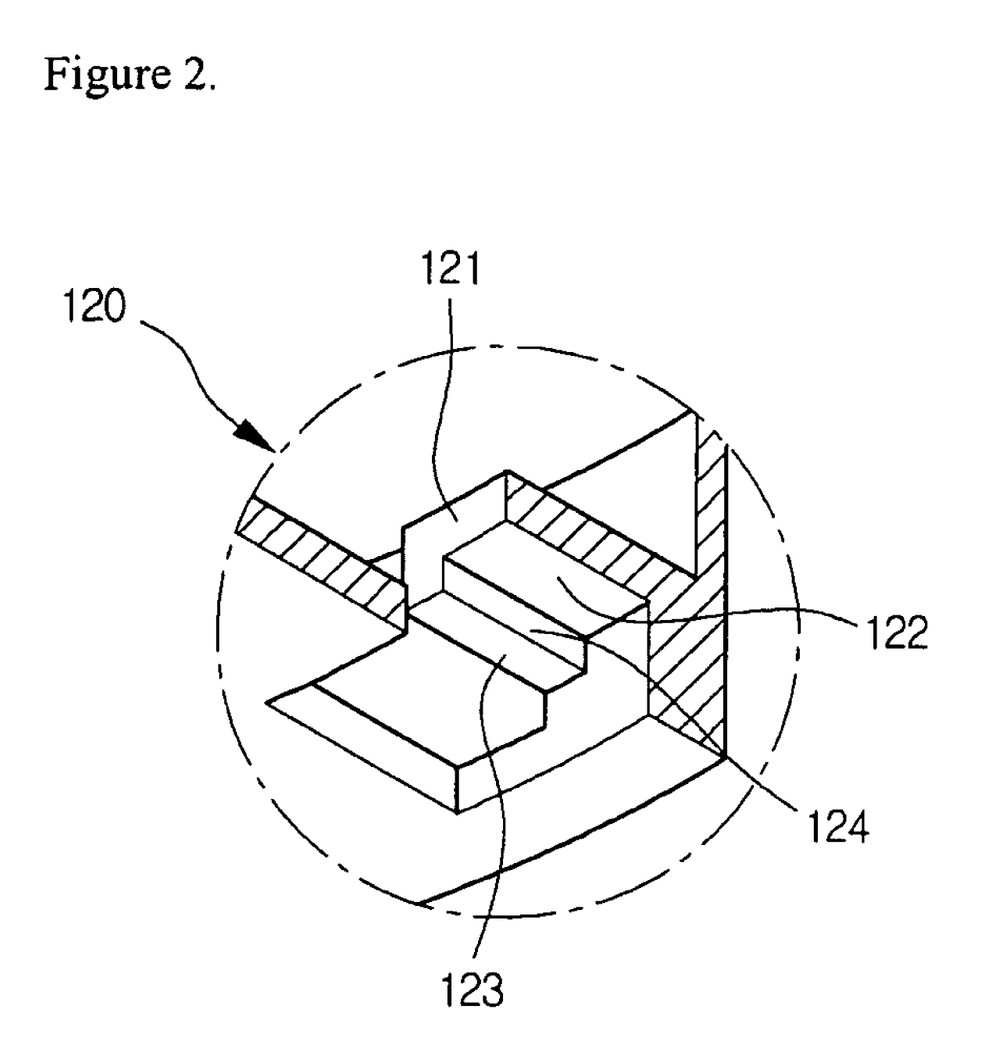
FIG. 2 is a rear perspective view of a back yoke coupler formed on a turntable according to the first embodiment of the present invention.
Figure 3:
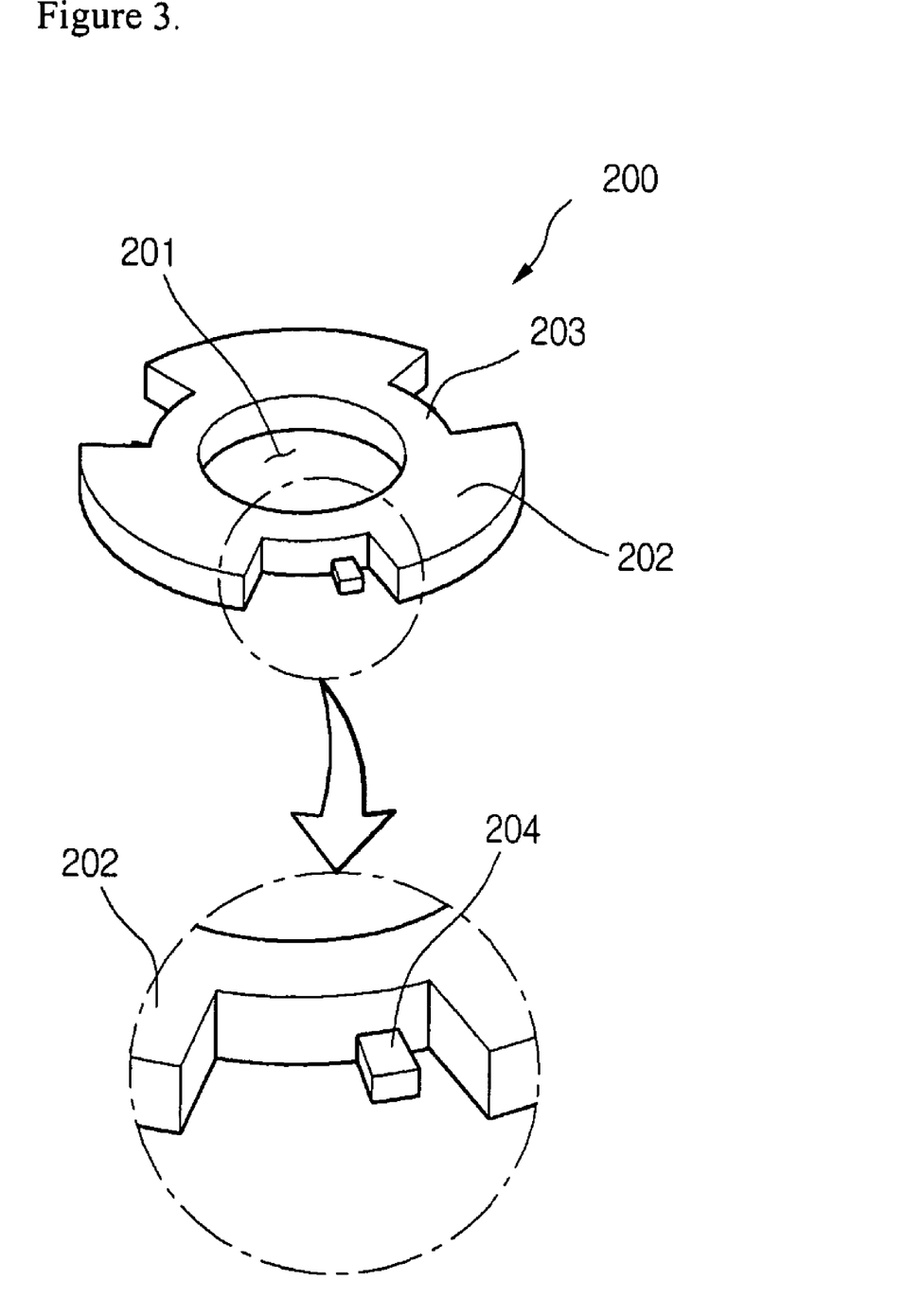
FIG. 3 is a perspective view of a back yoke according to the first embodiment of the present invention.

FIG. 1 is a perspective view of a turntable according to the first embodiment of present invention, FIG. 2 is a rear perspective view of a back yoke coupler formed on a turntable according to the first embodiment of the present invention, and FIG. 3 is a perspective view of a back yoke according to the first embodiment of the present invention.

Referring to FIGS. 1 through 3, a turntable 100 is formed in a discoid shape with a predetermined radius. An optical disc is mounted on the turntable 100. The bottom portion of the turntable 100 is concaved and is connected to a predetermined portion of the spindle motor. The top portion of the turntable 100 has a flat structure to rest an optical disc on.

The central portion of the turntable 100 has a through-hole 102 formed therein for inserting and fastening the rotating shaft of the spindle motor. A cylindrical hole forming portion 103 is spaced a predetermined distance radially outward from the through hole 102 on the turntable 100. A back yoke fastening hole 104 is formed between inside of the hole forming portion 103 and the outer perimeter of the through-hole 102. A back yoke 200 inserts into the back yoke fastening hole 104. By inserting the back yoke 200 into the back yoke fastening hole 104, a loss of a magnetic field emitted by a magnet can be prevented. To fix the back yoke 200 to the back yoke fastening hole 104, a back yoke coupler 120, in the form of a coupling protruding portion, is formed.

The back yoke coupler 120 is formed around the turntable 100 in a circumference arrangement. Specifically, the back yoke coupler 120 is formed as open holes around a circumference of the turntable 100.

The back yoke 200 has a through-hole 201 formed in its middle. A body 202 and a connecting portion 203 are alternately formed around the circumference of the through-hole 201. The body 202 is formed to protrude radially outward a predetermined distance farther than the connecting portion 203. In this embodiment, the body 202 and the connecting portion 203 are respectively provided in triplicate.

To allow the back yoke 200 to be assembled to the back yoke fastening hole 104, the body 202 and its connecting lines may be formed along a regular circumference, and the size of that circumference may be formed to be less by a predetermined amount than that of the back yoke fastening hole 104.

The back yoke 200 forms a turntable coupler 204. In this embodiment, the turntable coupler 204 is a coupling protrusion that protrudes a predetermined distance radially outward from the connecting portion 203 of the back yoke 200. The turntable coupler 204 is fastened to the back yoke coupler 120. In detail, the back yoke 200 is first inserted in the back yoke fastening hole 104, and is then rotated by a predetermined amount. Here, the turntable coupler 204 couples to the back yoke coupler 120 of the turntable 100, and the back yoke 200 may be fixed to the turntable 100.

Referring to FIG. 2, an extended portion 121 and a projection 123 are formed on the back yoke coupler 120. The extended portion 121 extends from the lower surface of the hole forming portion 103, and the projection 123 protrudes downward from the extended portion 121. A surface of the turntable coupler 204 on the back yoke 200 catches on a side 124 of the projection 123. In this way, the back yoke 200 is prevented from disengaging from the turntable 100 when the latter rotates and stops repeatedly.

The projection 123 is designed not to disengage with the turntable coupler 204 of the back yoke 200 in a direction opposite to the rotating direction of the turntable coupler 204, in order to couple the turntable coupler 204 with the back yoke coupler 120 of the turntable. Accordingly, the turntable assembly in this embodiment does not use adhesion when assembling the back yoke 200 to the turntable 100, but instead rotates the back yoke 200 for assembly, so that the assembly process becomes simpler. Also, by not using adhesion, unevenness, assembly defects, etc. caused by adhesion may be obviated.

The paired turntable and back yoke couplers 204 and 120 are provided in plurality to securely couple the turntable 100 with the back yoke 200.

Figure 4:
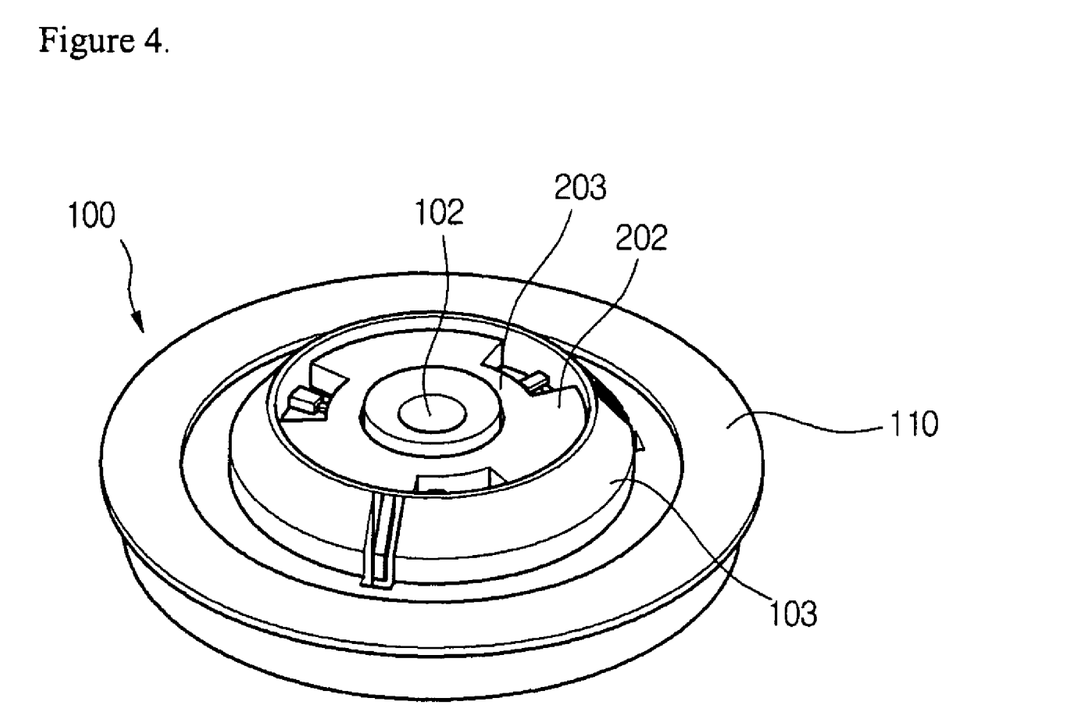
FIG. 4 is a perspective view of a back yoke placed on a turntable according to the first embodiment of the present invention.

FIG. 4 is a perspective view of a back yoke placed on a turntable according to the first embodiment of the present invention.

Referring to FIG. 4, the turntable coupler 204 formed on the back yoke 200 is has been fastened to the back yoke coupler 120 formed on the turntable 100, so that the back yoke 200 is assembled with the turntable 100.

The turntable coupler 204 formed on the back yoke 200 rotates and inserts at the bottom of the back yoke coupler 120 formed on the turntable 100, to couple the back yoke 200 to the turntable 100.

Here, the turntable coupler 204 of the back yoke 200 catches on the projection formed on the back yoke coupler 120, in order to prevent disengagement of the back yoke 200 when the turntable 100 repeatedly rotates and stops.

Figure 5:
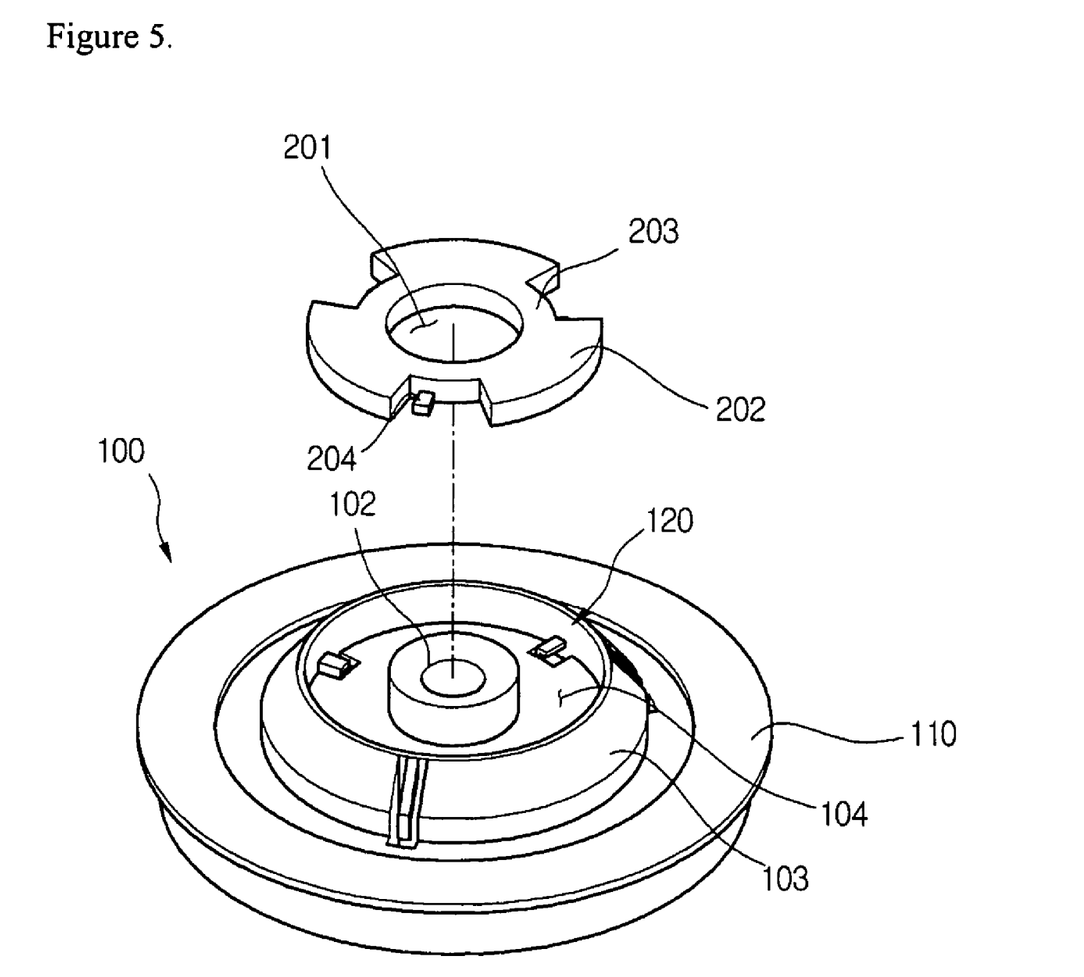
FIG. 5 is a perspective view of a back yoke before it is fastened to a turntable according to the first embodiment of the present invention.
Figure 6:
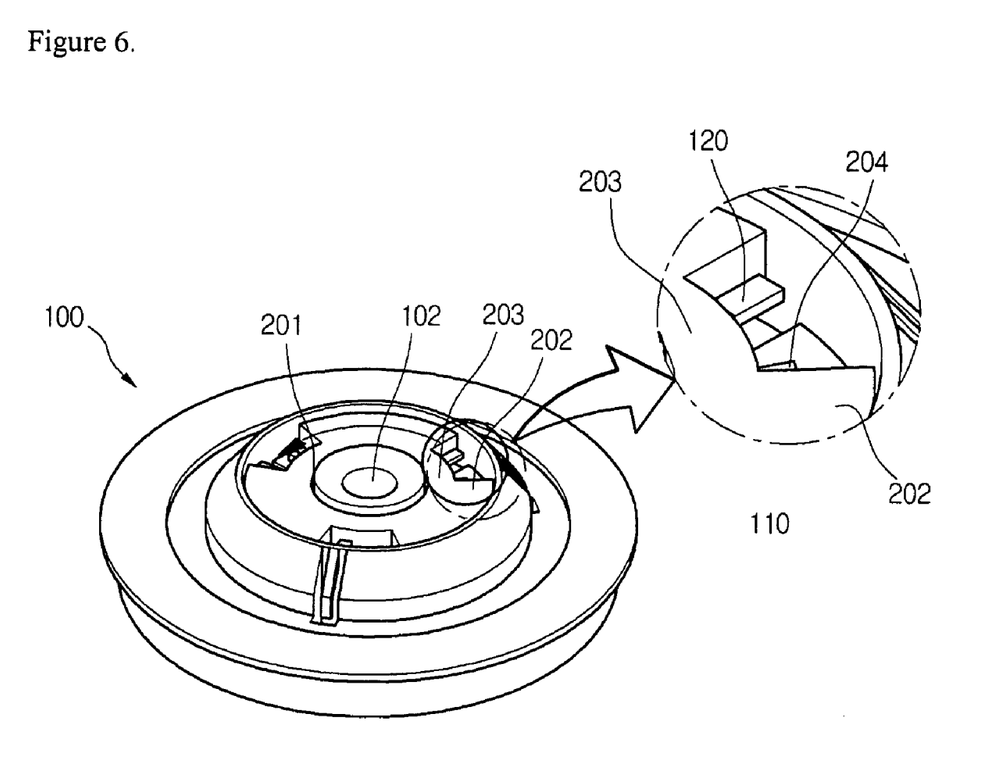
FIG. 6 is a perspective view of a back yoke placed to a turntable according to the first embodiment of the present invention.
Figure 7:
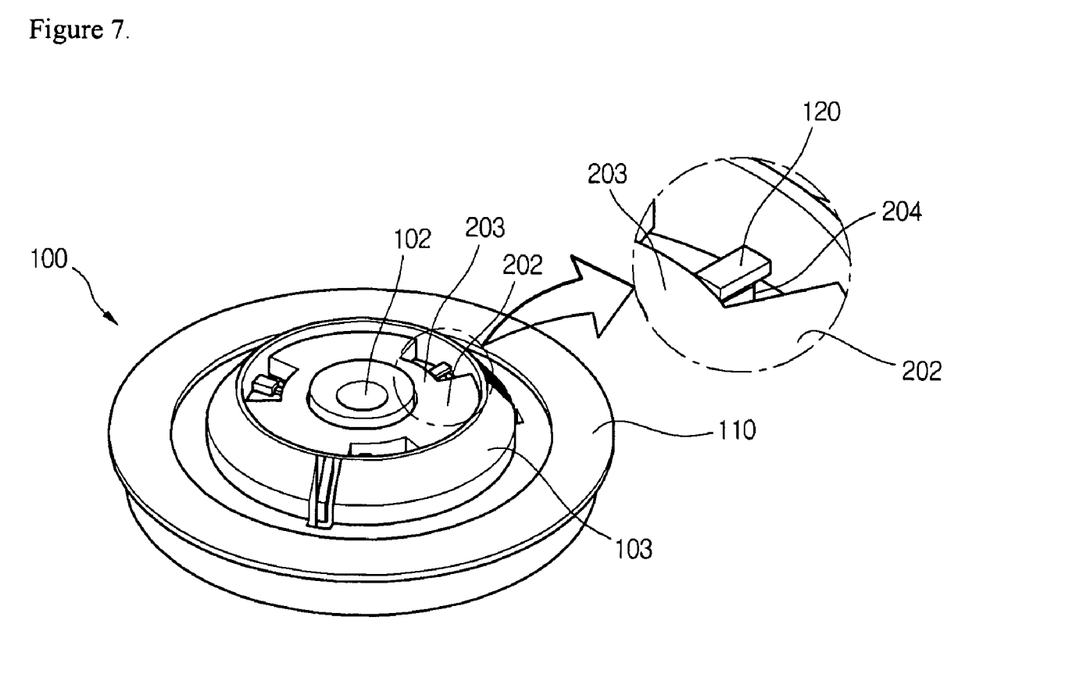
FIG. 7 is a perspective view of the back yoke in FIG. 6 fixed to the turntable.

FIGS. 5 through 7 are perspective views showing the process of fastening the back yoke to the turntable according to the first embodiment of the present invention.

FIG. 5 is a perspective view of a back yoke before it is fastened to a turntable according to the first embodiment of the present invention, FIG. 6 is a perspective view of a back yoke placed to a turntable according to the first embodiment of the present invention, and FIG. 7 is a perspective view of the back yoke in FIG. 6 fixed to the turntable.

Referring to FIGS. 5 through 7 below, a description of the fastening process of a back yoke 200 to a turntable 100 according to the present invention will be given.

First, referring to FIG. 5, the back yoke 200 is aligned above the central area of the turntable 100. Here, the turntable coupler 204 formed on the back yoke 200 and the back yoke coupler 120 formed on the turntable 100 are disposed oppositely to mutually mesh and fasten.

Next, Referring to FIG. 6, the back yoke 200 is inserted into the back yoke fastening hole 104 formed in the turntable 100. Then, the turntable coupler 204 of the back yoke 200 is disposed at the bottom of the back yoke coupler 102, and then the back yoke 200 is rotated.

When the back yoke 200 is thus rotated, the turntable coupler 204 meshes with the back yoke coupler 120, so that back yoke 200 and the turntable 100 are completely fixed, as shown in FIG. 7. Here, the turntable coupler 204 of the back yoke 200 catches on the projection 123 formed on the back yoke coupler 120 and is completely fixed, so that the back yoke 200 does not disengage even when the turntable 100 repeatedly rotates and stops.

Figure 8:
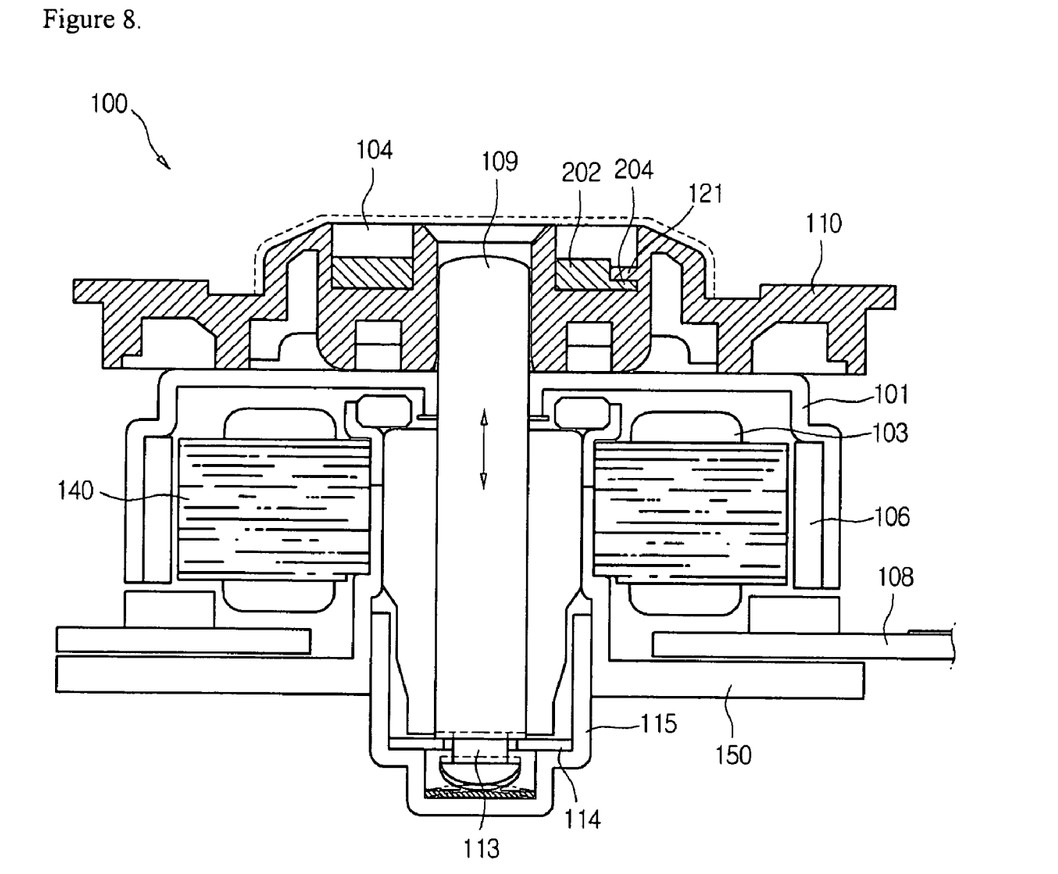
FIG. 8 is a vertical sectional view of a turntable fastened to a spindle motor according to the first embodiment of the present invention.

FIG. 8 is a vertical sectional view of a turntable fastened to a spindle motor according to the first embodiment of the present invention.

Referring to FIG. 8, a spindle motor 100 that rotates an optical disc includes a base plate 150, a printed circuit board (PCB) 108, a bearing housing 105, a shaft holder 115, a rotating shaft 109, a rotor 101, a stator 103, a coil 140, an e-ring 114, a ring slot 113, and a magnet 106.

The turntable 100 forming the back yoke coupler 120 is assembled at the top of the rotating shaft 109, so that the back yoke 200 may be fastened like a clip; and the back yoke 200 is fastened to the back yoke fastening hole 104 of the turntable 100.

The turntable coupler 204 is formed on the back yoke 200 in opposition to the back yoke coupler 120.

The above-structured spindle motor 100 fixes an optical disc that is placed atop the turntable 100 using a clamp.

Here, a magnet is assembled on the back yoke 200 assembled to the turntable 100, and the back yoke 200 is fastened to strengthen the magnetic field of the magnet.

The clamp fixed atop the turntable 100 and the magnet on the back yoke 200 function to fix the optical disc in place.

The back yoke coupler 120 is formed in the back yoke fastening hole 104 of the turntable 100, and the turntable coupler 204 is formed on the back yoke 200, so that the back yoke 200 can be fixed to the turntable 100 using a one-touch method, and not an adhering process.

Below, the second embodiment of the present invention will be described. In the description, elements already described in the first embodiment shall be omitted herefrom and shall be deemed included by said previous descriptions.

Figure 9:
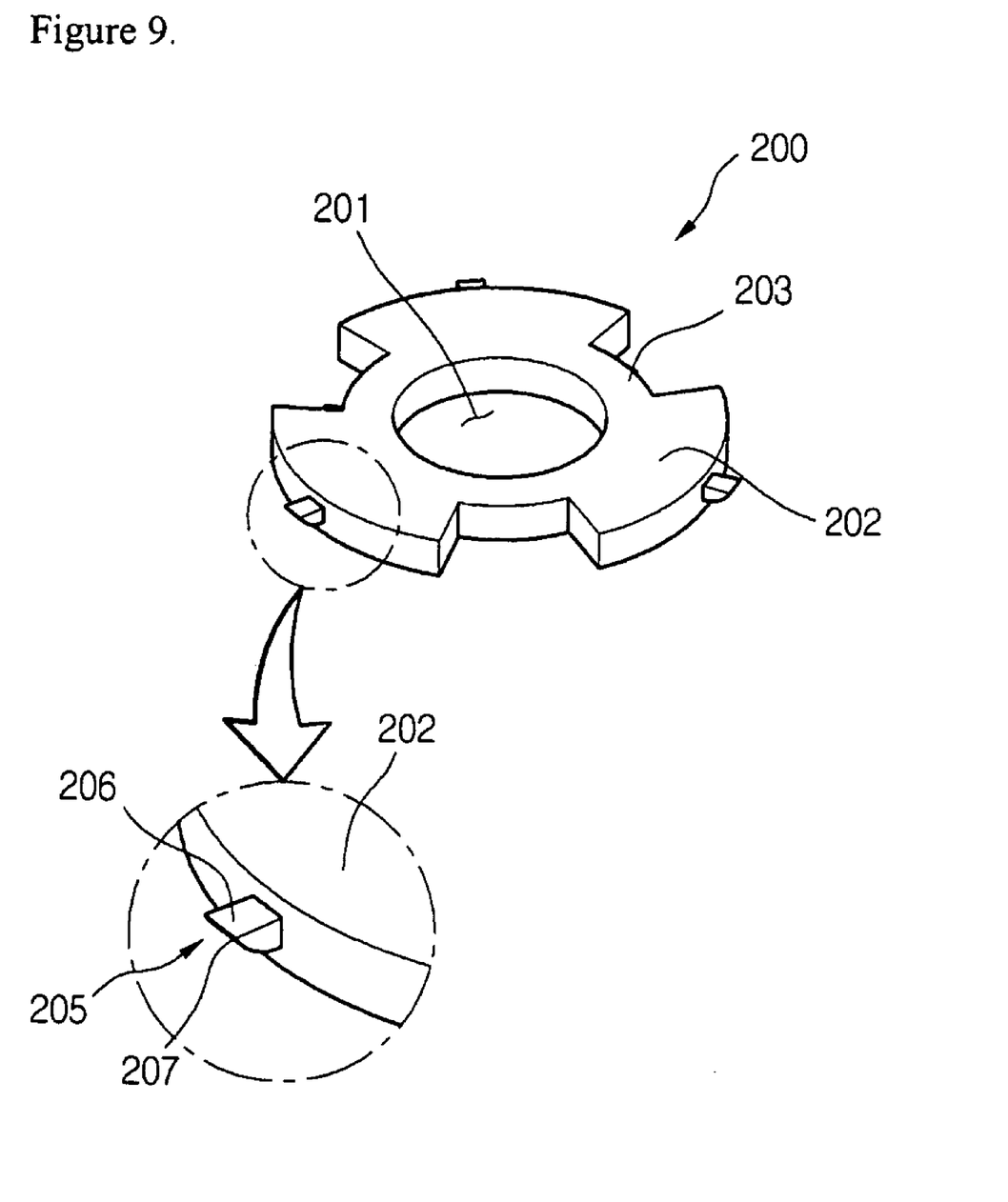
FIG. 9 is a perspective view of back yoke according to the second embodiment of the present invention.
Figure 10:
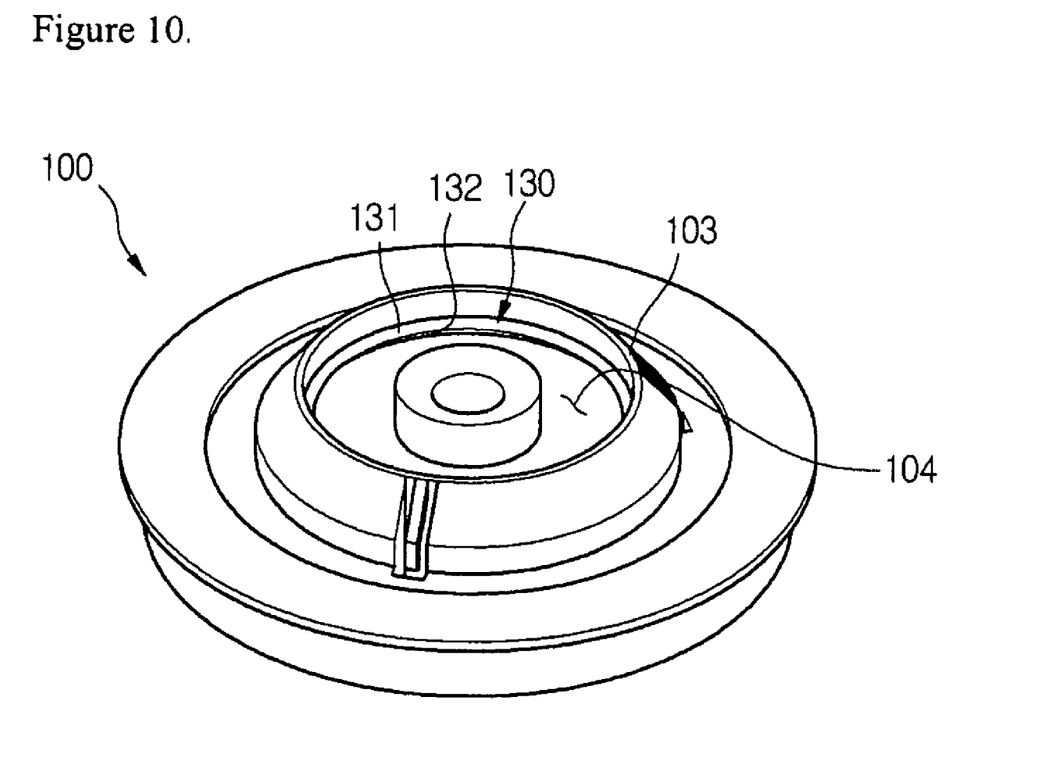
FIG. 10 is a perspective view of a turntable according to the second embodiment of the present invention.

FIG. 9 is a perspective view of back yoke according to the second embodiment of the present invention, and FIG. 10 is a perspective view of a turntable according to the second embodiment of the present invention.

Referring to FIGS. 9 and 10, a through-hole 201 is formed in the center of the back yoke 200. The body 202 and the connecting portion 203 are alternately arranged around the circumference of the through-hoe 201. In this embodiment, the body 202 and the connecting portion 203 are respectively provided in triplicate.

The turntable 100 includes a back yoke fastening hole 104, and a hole forming portion 103 for forming the back yoke fastening hole 104. The inner surface of the hole forming portion 103 includes a back yoke rim 130 that is a coupling portion.

The back yoke rim 130 is formed around the inner surface of the hole forming portion 103, and may be in the shape of a ring. The back yoke rim 130 includes a back yoke press-fitting surface 131 that is slanted or rounded by a predetermined amount, and a back yoke catch surface 132 on the rear of the back yoke press-fitting surface 131.

A turntable catch protrusion 205, being a coupling protrusion, is formed to protrude from the outer edge of the body 202 of the back yoke 200. When the back yoke 200 is inserted in the back yoke fastening hole 104 of the turntable 100, the turntable catch protrusion 205 catches on the back yoke rim 130, so that the back yoke 200 is fixed to the turntable 100.

The turntable catch protrusion 205 includes a turntable press-fitting surface 207 at a bottom thereof, and a turntable catch surface 206 at a top thereof. When the turntable catch protrusion 205 is coupled to the back yoke catch protrusion 130, the turntable press-fitting surface 207 contacts the back yoke press-fitting surface 131, and is then press-fitted therealong. When the peak of the turntable catch protrusion 205 passes over the peak of the back yoke catch protrusion 130, the turntable catch surface 206 catches on the back yoke catch surface 132. Then, the back yoke catch protrusion 130 latches to the turntable catch protrusion 205, so that the turntable catch protrusion 205 does not disengage from the back yoke catch protrusion 130. The back yoke 200 is thus fixed to the turntable 100.

Because the back yoke catch protrusion 130 is annularly formed along the inner surface of the hole forming portion 103, disengaging of the turntable catch protrusion 205 can be more reliably prevented.

The turntable catch protrusion 205 may be formed on each of the plurality of bodies 202. In this case, each of the plurality of turntable catch protrusions 205 acts as a coupling portions for coupling the back yoke 200 to the turntable 100, so that the back yoke 200 and the turntable are fixed at a plurality of points. Accordingly, the fixing of the back yoke 200 to the turntable 100 is secure.

The plurality of turntable catch protrusions 205 may form the same angle between one another. In this case, the fixing of the back yoke 200 to the turntable 100 is evenly distributed at points around the circumferences of the two components. Thus, the back yoke 200 is more reliably fixed to the turntable 100.

Figure 11:
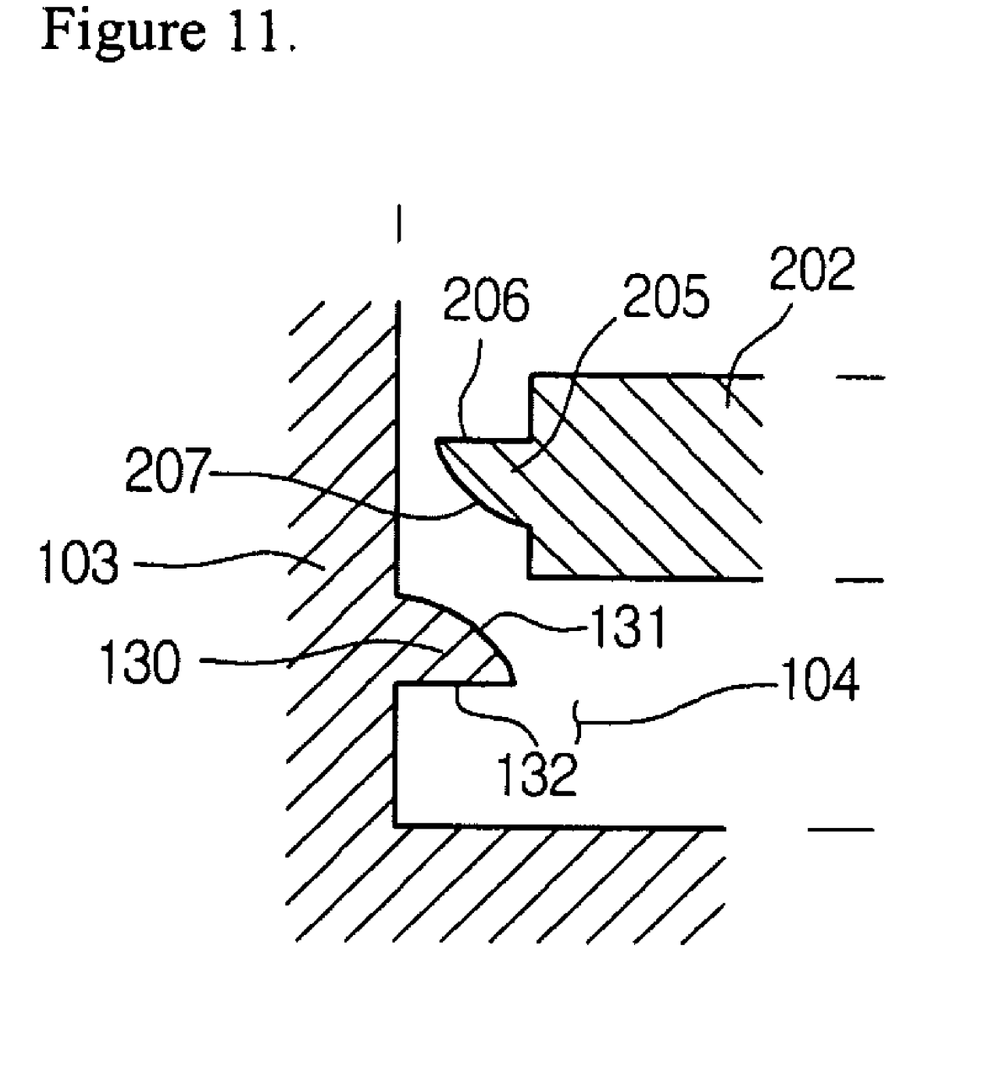
FIG. 11 is a vertical sectional view showing catch protrusions of a turntable and back yoke before they come into mutual contact, according to the second embodiment of the present invention.
Figure 12:
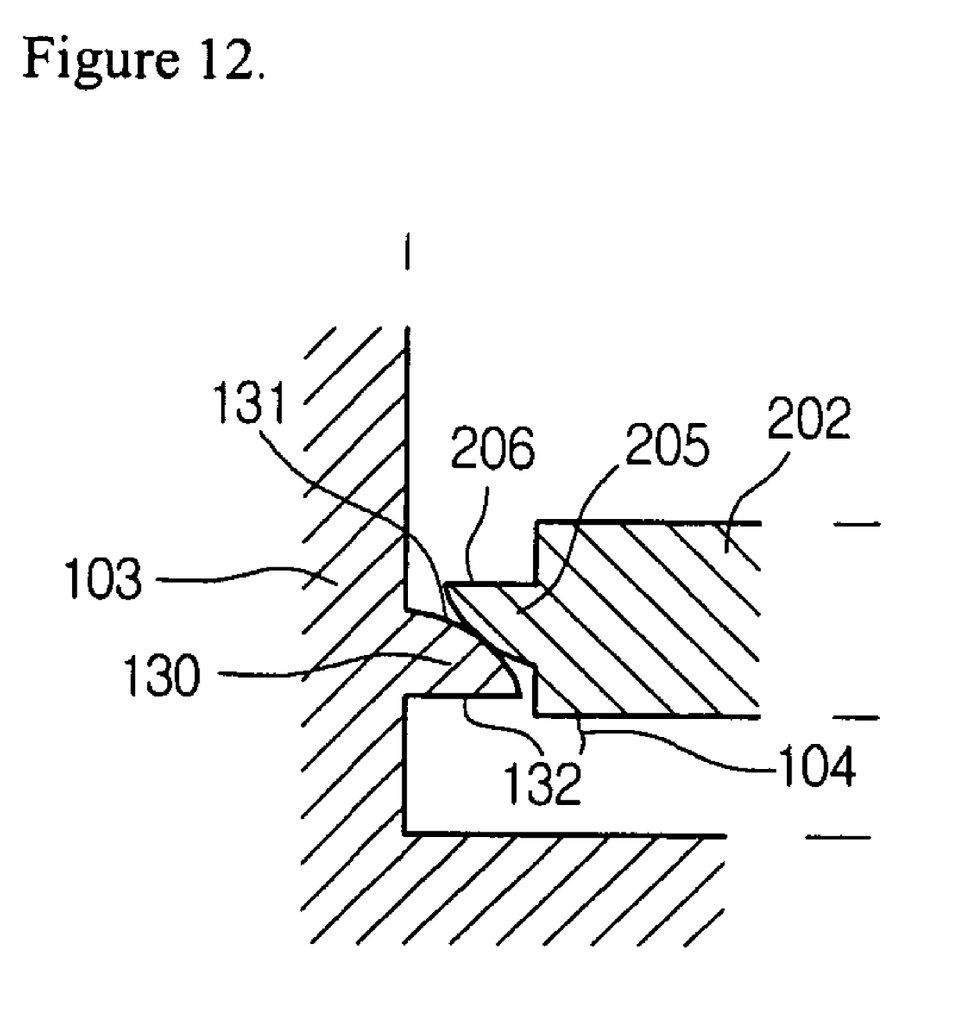
FIG. 12 is a vertical sectional view showing the catch protrusions of the turntable and back yoke in FIG. 11 as they are mutually press fitted.
Figure 13:
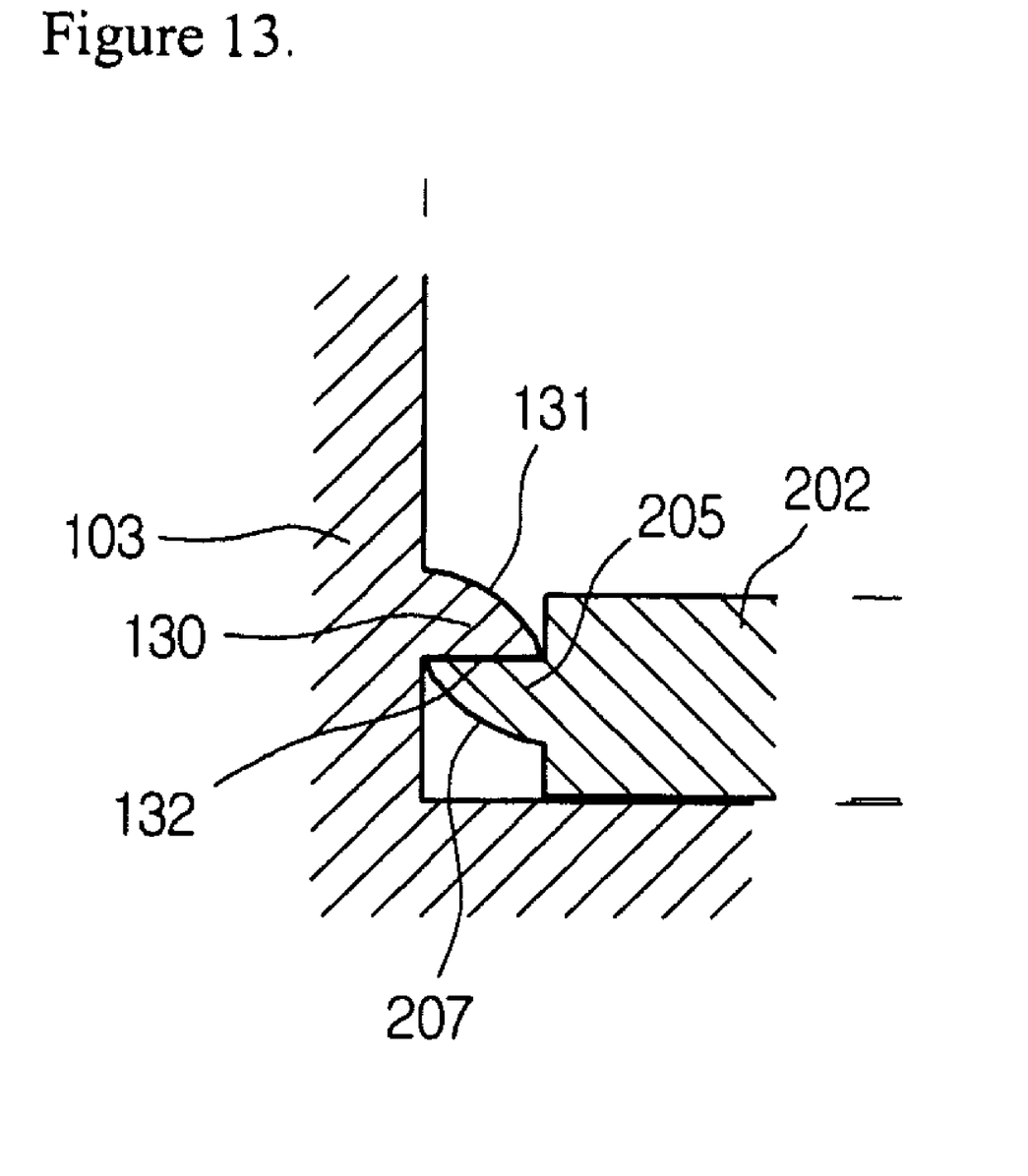
FIG. 13 is a vertical sectional view showing the catch protrusions of the turntable and back yoke in FIG. 12 in a mutually engaged state.

FIGS. 11 through 13 are vertical sectional diagrams showing the coupling process of the turntable catch protrusions to the back yoke catch protrusions, according to the second embodiment of the present invention.

FIG. 11 is a vertical sectional view showing catch protrusions of a turntable and back yoke before they come into mutual contact, according to the second embodiment of the present invention, FIG. 12 is a vertical sectional view showing the catch protrusions of the turntable and back yoke in FIG. 11 as they are mutually press fitted, and FIG. 13 is a vertical sectional view showing the catch protrusions of the turntable and back yoke in FIG. 12 in a mutually engaged state.

Below, the coupling process of the turntable catch protrusions to the back yoke coupling protrusions, according to the second embodiment of the present invention, will be described with reference to FIGS. 11 through 13.

First, referring to FIG. 11, the back yoke 200 is inserted in the back yoke fastening hole 104 of the turntable 100, and then the turntable catch protrusions 205 are inserted into the back yoke insert fastening hole 104.

Then, referring to FIG. 12, the back yoke 200 is pressed downward, so that the turntable catch protrusions 205 are also pressed downward. After the pressing down of these parts, the turntable press-fitting surfaces 207 contact the back yoke press-fitting surfaces 131. In this state, when external force is applied, the turntable press-fitting surfaces 207 and the back yoke press-fitting surfaces 131 are press-fitted together, so that the turntable catch protrusions 205 descend.

After the descending, the peaks of the turntable catch protrusions 205 pass the peaks of the back yoke catch protrusions 130, so that the turntable catch protrusions are positioned below the back yoke catch protrusions 130. In this state, the turntable catch surfaces 206 and the back yoke catch surfaces 132 contact one another. Then, disengaging of the turntable catch protrusions 205 can be prevented, and the back yoke 200 can be fixed in the back yoke fastening hole 104 of the turntable 100.

The present invention provides a turntable assembly that allows easy fastening of the back yoke to the turntable without adhering the two components. Thus, the turntable assembly can be easily assembled, and disconnecting or disengaging of the back yoke from the turntable during the rotation of an optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A turntable assembly of a spindle motor, comprising:
   a turntable; and
   a back yoke installed on the turntable,
   wherein the turntable includes at least one of a turntable coupling protrusion and a protrusion coupler formed thereon, and the back yoke includes at least one of a protrusion coupler and a coupling protrusion formed thereon to face the at least one turntable coupling protrusion and protrusion coupler formed on the turntable, and the coupling protrusion is inserted in the protrusion coupler, for fixing the back yoke to the turntable,
   wherein the back yoke includes a through-hole, a connecting portion formed around the through-hole and a body formed around the through-hole and having a radial thickness greater by a predetermined amount than a radial thickness of the connecting portion,
   wherein the connecting portion includes the at least one of the turntable coupling protrusion and a protrusion coupler,
   wherein the coupling protrusion is rotated and inserted in the protrusion coupler, and
   wherein the protrusion coupler comprises a projection that is abutted against the coupling protrusion for coupling the coupling protrusion to the protrusion coupler.

2. The turntable assembly of a spindle motor according to claim 1, wherein the coupling protrusion is formed on the back yoke, and the protrusion coupler is formed on the turntable.

3. The turntable assembly of a spindle motor according to claim 2, wherein the coupling protrusion protrudes toward an outer direction of the back yoke.

4. The turntable assembly of a spindle motor according to claim 1, wherein the protrusion coupler has a projection formed thereon for catching the coupling protrusion.

5. The turntable assembly of a spindle motor according to claim 1, wherein the coupling protrusion is press-fitted with the protrusion coupler.

6. The turntable assembly of a spindle motor according to claim 1, wherein the coupling protrusion and the protrusion coupler are paired and formed in plurality.

7. A turntable assembly of a spindle motor, comprising:
   a turntable;
   a back yoke installed on the turntable;
   a back yoke coupler formed on the turntable; and
   a turntable coupler formed on the back yoke and rotatively inserted in the back yoke coupler, for fixing the back yoke to the turntable,
   wherein the back yoke includes a through-hole, a connecting portion around the through-hole, and a body with a radial thickness thicker by a predetermined amount than a radial thickness of the connecting portion,
   wherein the turntable coupler is provided with the connection portion,
   wherein the outer periphery of the body is in contact with the inner surface of the turntable, and
   wherein the back yoke coupler comprises a projection that is abutted against the turntable coupler for coupling the turntable coupler to the back yoke coupler.

8. The turntable assembly of a spindle motor according to claim 7, wherein the back yoke coupler is disposed in a radial direction of the turntable.

9. The turntable assembly of a spindle motor according to claim 7, wherein the back yoke coupler includes a projection formed thereon for catching the turntable coupler.

* * * * *